(12) United States Patent
Hirai

(10) Patent No.: US 8,834,189 B2
(45) Date of Patent: Sep. 16, 2014

(54) ROTATABLE CONNECTOR DEVICE

(71) Applicant: Shuji Hirai, Shiga (JP)

(72) Inventor: Shuji Hirai, Shiga (JP)

(73) Assignees: Furukawa Electronic Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/632,707

(22) Filed: Oct. 1, 2012

(65) Prior Publication Data

US 2013/0095680 A1  Apr. 18, 2013

Related U.S. Application Data

(63) Continuation of application No. PCT/JP2011/056876, filed on Mar. 23, 2011.

(30) Foreign Application Priority Data

Mar. 30, 2010 (JP) ................................. 2010-078598

(51) Int. Cl.
*H01R 3/00* (2006.01)
*H01R 13/60* (2006.01)
*H01R 35/02* (2006.01)
*B60R 16/027* (2006.01)

(52) U.S. Cl.
CPC .............. *H01R 13/60* (2013.01); *H01R 35/025* (2013.01); *B60R 16/027* (2013.01)
USPC ...................................................... 439/164

(58) Field of Classification Search
CPC .. H01R 35/025; H01R 35/02; H01R 2201/26; B60R 16/027; H02G 11/00
USPC ........................................ 439/164, 11, 13, 15
See application file for complete search history.

(56) References Cited

U.S. PATENT DOCUMENTS

| 4,844,359 A | | 7/1989 | Kato | |
| 5,847,342 A | * | 12/1998 | Uchiyama et al. | ......... 200/61.54 |
| 6,409,527 B1 | * | 6/2002 | Adachi et al. | ................. 439/164 |

(Continued)

FOREIGN PATENT DOCUMENTS

| JP | 9148025 A | 6/1997 |
| JP | 2005-327575 A | 11/2005 |
| JP | 2009-158170 A | 7/2009 |

OTHER PUBLICATIONS

International Search Report issued in PCT/JP2011/056876, mailing date May 10, 2011 (2 pages).

*Primary Examiner* — Amy Cohen Johnson
*Assistant Examiner* — Vladimir Imas
(74) *Attorney, Agent, or Firm* — Osha Liang LLP

(57) ABSTRACT

A rotatable connector device includes a fixed-side member which is to be fixed, and a rotatable-side member which is relatively rotatably attached to the fixed-side member. The rotatable-side member receives a rotation input. The rotatable connector device have a fixed-side cable end accommodation section, projecting from an outer circumferential surface of the fixed-side member in a tangential direction thereof, for accommodating and holding a terminal conductor connection section provided at an end of a flat cable accommodated in the rotatable connector device. The flat cable has a bent portion, in a portion thereof on a side of the terminal conductor connection section, for bending the flat cable so as to shift the portion on the side of the terminal conductor connection section in a width direction of the flat cable.

6 Claims, 7 Drawing Sheets

(56) References Cited

U.S. PATENT DOCUMENTS

| | | | |
|---|---|---|---|
| 6,494,396 B2* | 12/2002 | Sugata | 242/388.5 |
| 6,715,707 B2* | 4/2004 | Sakata | 242/388 |
| 7,223,104 B2* | 5/2007 | Suenaga | 439/15 |
| 7,425,143 B2* | 9/2008 | Mitsui | 439/164 |
| 7,452,224 B1* | 11/2008 | McDonald et al. | 439/164 |
| 7,488,178 B2* | 2/2009 | Inotsuka | 439/15 |
| 7,686,632 B2* | 3/2010 | Mitsui | 439/164 |
| 7,758,363 B2* | 7/2010 | Tanaka et al. | 439/164 |
| 7,775,800 B2* | 8/2010 | Reischl et al. | 439/15 |
| 7,811,108 B2* | 10/2010 | Oishi et al. | 439/164 |
| 8,083,525 B2* | 12/2011 | Fiala et al. | 439/15 |
| 8,382,500 B2* | 2/2013 | Adachi | 439/164 |
| 8,529,272 B2* | 9/2013 | Kamiya | 439/15 |
| 2004/0053517 A1* | 3/2004 | DuRocher et al. | 439/15 |
| 2009/0011626 A1* | 1/2009 | Mitsui | 439/164 |
| 2009/0156034 A1* | 6/2009 | Araki et al. | 439/164 |
| 2012/0329314 A1* | 12/2012 | Adachi | 439/501 |

* cited by examiner

ROTATABLE CONNECTOR DEVICE

TECHNICAL FIELD

The present invention relates to a rotatable connector device, and specifically to a connector device capable of preventing generation of an unusual sound.

BACKGROUND ART

A rotatable connector device includes a fixed-side member and a rotatable-side member which is relatively rotatably attached to the fixed-side member. A rotatable connector device for electrically connecting a vehicle body side of an automobile and elements on the side of a steering wheel includes a fixed-side member to be fixed to the vehicle body and a rotatable-side member to which the steering wheel is fixed such that the steering wheel is not relatively rotatable.

The fixed-side member and the rotatable-side member are connected to each other via a flat cable. At each of both ends of the flat cable, a terminal conductor connection section which holds terminal conductors formed of busbars is provided. The terminal conductor connection section is held by the fixed-side member or the rotatable-side member.

In this state, as shown in FIG. 6, a terminal conductor connection section 103 provided on a flat cable 102 which is held by a fixed-side member 101 is on the extension of the flat cable 102. Therefore, as shown in figures in Patent Document 1 identified below, a fixed-side cable end accommodation section 104, into and in which the fixed-side terminal conductor connection section 103 is introduced and held, extends up to a relatively high position in a rotatable connector device 105. Namely, as shown in FIG. 6, the fixed-side cable end accommodation section 104 is close to a rotatable-side member 106 which is relatively rotatable with respect to the fixed-side member 101. As a result, there is an undesirable possibility that during the rotation of the rotatable-side member, the rotatable-side member contacts the fixed-side cable end accommodation section 104 of the fixed-side member 101 and generates an unusual sound.

CITATION LIST

Patent Literature

Patent Document 1: Japanese Laid-Open Patent Publication No. 2005-327575

SUMMARY OF INVENTION

Technical Problem

In order to avoid such an inconvenience, it is conceivable to provide a specific routing of conductors, for example, to bend terminal conductors 107 held by the terminal conductor connection section 103 in a width direction of the flat cable 102. However, this complicates the structure of the conductor routing and also enlarges the terminal conductors, resulting in a problem of raising the cost.

When the rotatable connector device 105 is fixed on the side of a combination switch of the vehicle body, as shown in FIG. 7, the fixed-side cable end accommodation section 104 needs to be located on a top side of the rotatable connector device 105 in a thickness direction thereof. This requires a part of a column cover 108 to be cut off in order to avoid contact between the fixed-side cable end accommodation section 104 and the column cover 108. Such a cut-off portion 109 is visible when an area below the steering wheel is peeped at. This gives a strong impression that the internal structure is exposed, and the appearance thereof is poor. There is another problem that foreign objects are likely to enter the column from the cut-off portion 109.

The present invention has a main object of preventing generation of an unusual sound without, for example, complicating the structure of the terminal conductors and also providing another advantage.

Solution to Problem

Means for achieving the above-described object is a rotatable connector device, including a fixed-side member which is to be fixed; and a rotatable-side member which is relatively rotatably attached to the fixed-side member, the rotatable-side member receiving a rotation input; the rotatable connector device having a fixed-side cable end accommodation section, projecting from an outer circumferential surface of the fixed-side member in a tangential direction thereof, for accommodating and holding a terminal conductor connection section provided at an end of a flat cable accommodated in the rotatable connector device; wherein the flat cable has a bent portion, in a portion thereof on a side of the terminal conductor connection section, for bending the flat cable so as to shift the portion on the side of the terminal conductor connection section in a width direction of the flat cable.

Alternatively, the means for achieving the above-described object may be a rotatable connector device in which a bent portion is formed, which is folded to be shortened so as to shift the portion on the side of the terminal conductor connection section in a width direction of the flat cable, resulting in the flat cable being shortened in a longitudinal direction thereof; or a rotatable connector device in which a bent portion, which is folded, to be shortened, along a crease extending in a direction crossing a longitudinal direction of the flat cable, is formed.

Since the bent portion shifts the portion of the flat cable on the side of the terminal conductor connection section in a width direction of the flat cable, the position of the terminal conductor connection section in the thickness direction of the rotatable connector device can be low.

Advantageous Effects of Invention

According to the present invention, owing to the bent portion, the position of the terminal conductor connection section in the thickness direction of the rotatable connector device is lowered. Therefore, the fixed-side cable end accommodation section for holding this section can be prevented from contacting the rotatable-side member. As a result, generation of an unusual sound can be avoided.

Moreover, this is realized by a simple structure of forming the bent portion in the flat cable. The structure is not complicated and the cost is not raised.

In the case where the rotatable connector device is covered with a column cover, it is sufficient to form an opening in the column cover merely for exposing the rotatable-side member. Unlike the case where a cut-off portion is made, deterioration of the external appearance can be avoided and invasion of foreign objects such as trash can be suppressed.

DESCRIPTION OF EMBODIMENTS

Hereinafter, embodiments of the present invention will be described with reference to the drawings.

Figure 1:
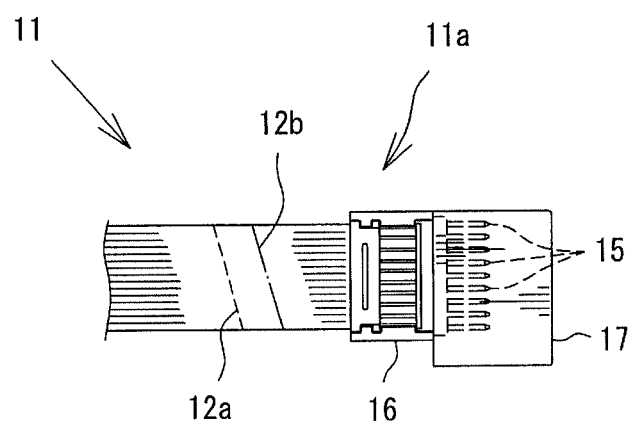
FIG. 1 is a front view of a bent portion of a flat cable.
Figure 1:
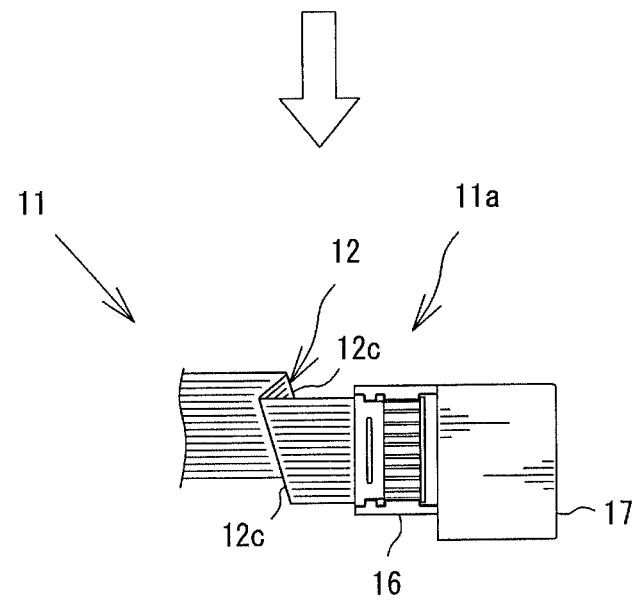
Figure 2:
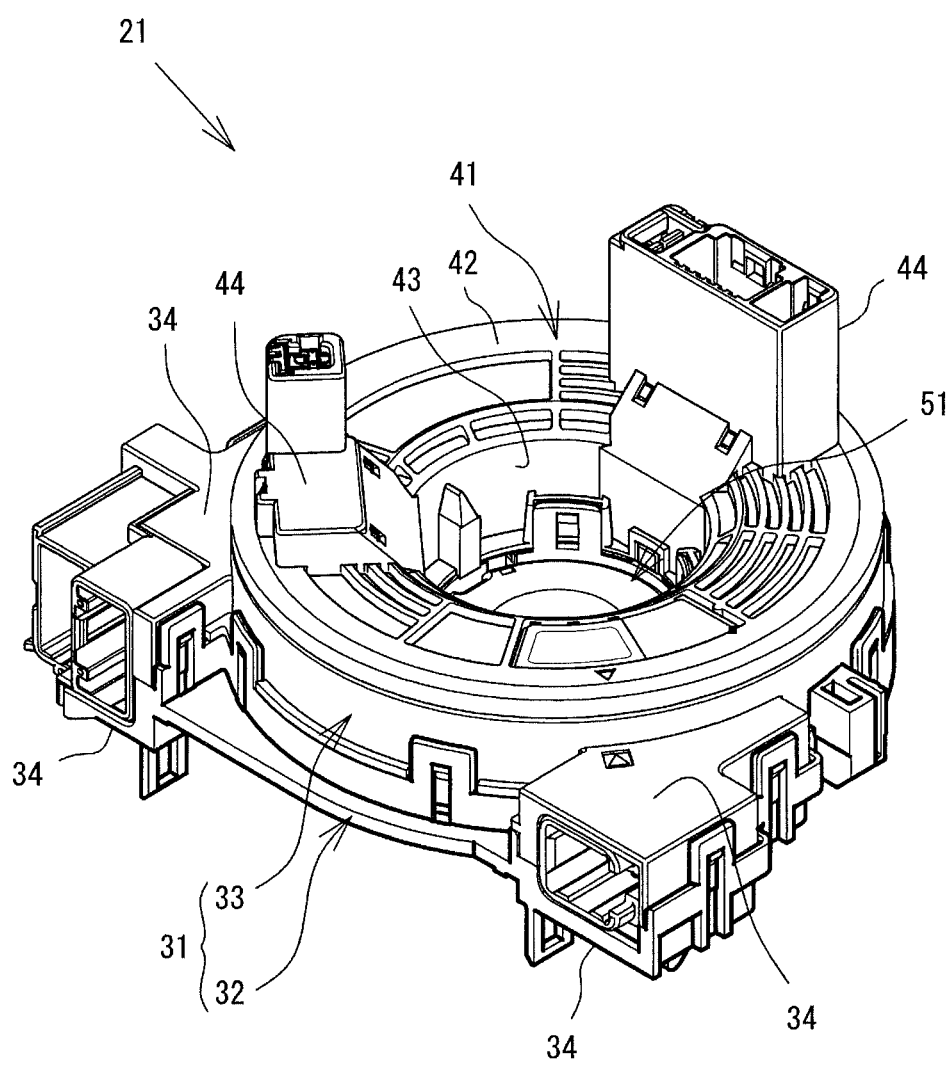
FIG. 2 is an isometric view of a rotatable connector device.

FIG. 1 is a front view of an end of a flat cable 11, which is an important part of the present invention, and FIG. 2 is an isometric view of a rotatable connector device 21 for accommodating flat cables 11.

The rotatable connector device 21 is to be located in a column section of an automobile. Specifically, the rotatable connector device 21 is to be located between a steering wheel (not shown) and a combination switch (not shown).

First, an overall general structure of the rotatable connector device 21 will be described.

The rotatable connector device 21 includes a stator 31 as a fixed-side member located on a bottom side, a rotator 41 as a part of a rotatable-side member located on a top side, and a rotation lock unit 51 as a part of the rotatable-side member for holding the rotator 41 at a neutral position with respect to the stator 31 (neutral position of the rotatable connector device 21) regarding the positions of the stator 31 and the rotator 41.

The stator 31 includes a fixed-side ring plate member 32 having a circular hole at a center thereof and an outer cylindrical member 33 having a circular shape when seen in a plan view and engaged with a top surface of an outer peripheral portion of the fixed-side ring plate member 32 to be integrated therewith.

A fixed-side cable end accommodation section 34 projecting in a tangential direction of an outer circumference of the outer cylindrical member 33 is formed at a position slightly below a top end of the outer cylindrical member 33. This fixed-side cable end accommodation section 34 is combined with a fixed-side cable end accommodation section 34 formed on the fixed-side ring plate member 32. Fixed-side ends 11a of the flat cables 11 (see FIG. 1) drawn from an accommodation space (not shown) are introduced into, and held in, these fixed-side cable end accommodation sections 34.

The rotator 41 includes a top board 42 which is ring-shaped when seen in a plan view and an inner cylindrical section 43 hung from an inner circumferential edge of the top board 42 and integrated with the top board 42, so as to form top surface of the fixed-side ring plate member 32 of the stator 31 and an inner circumferential surface of the outer cylindrical member 33 of the stator 31.

Rotatable-side cable end accommodation sections 44 are formed in an area from the inner cylindrical section 43 to the top board 42, and rotatable-side ends of the flat cables 11 (see FIG. 11) drawn from the accommodation space (not shown) are introduced into, and held in, the rotatable-side cable end accommodation sections 44.

As shown in FIG. 1, busbars 15 as terminal conductors are connected to each of both ends of each flat cable 11 accommodated in the rotatable connector device 21 having such a structure. The busbars 15 are integrally held by insert molding to mold sections 16 as terminal conductor connection sections. Among the mold sections 16 at both ends of the flat cable 11, the mold section 16 held in the fixed-side cable end accommodation section, namely, the mold section 16 at the fixed-side end 11a is provided with a housing 17 for enclosing connection terminals (not shown) of the busbars 15.

The fixed-side end 11a of the flat cable 11 (portion held in the fixed-side cable end accommodation section 34, which is on the terminal conductor connection section side) has a bent portion 12 at which the corresponding flat cable 11 is bent so as to shift this portion in a width direction of the flat cable 11. It is preferable that the bent portion 12 is folded to be shortened so as to shift the portion of the flat cable 11 which is held in the fixed-side cable end accommodation section 34 in the width direction of the flat cable 11, and the flat cable 11 is shortened in a longitudinal direction thereof. Alternatively, the bent portion 12 may be folded, to be shortened, along a crease extending in a direction crossing the longitudinal direction of the flat cable 11. In this case, as specifically shown in FIG. 1, the bent portion 12 may be formed of a trough line 12a and a ridge line 12b which are parallel to each other and extend in a direction crossing the longitudinal direction of the flat cable 11. In the figure, the dashed line represents the trough line 12a, and the one-dot chain line represents the ridge line 12b.

Figure 3:
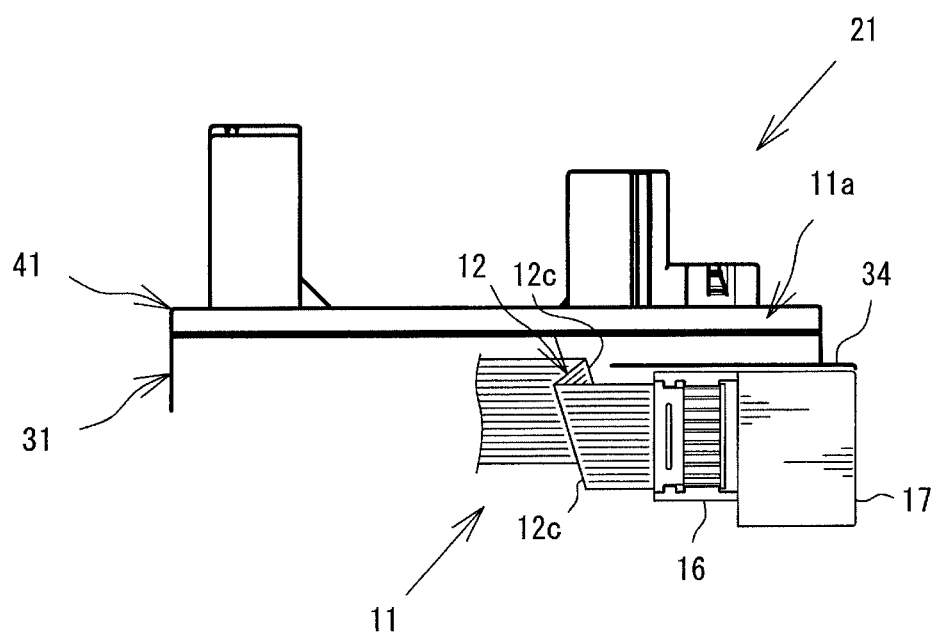
FIG. 3 shows how the bent portion acts.

As shown in FIG. 3, the fixed-side end 11a is shifted downward in a thickness direction of the rotatable connector device 21 so that the fixed-side end 11a can be accommodated in the fixed-side cable end accommodation section 34 which is formed at a position below the top end of the stator 31.

The amount by which the fixed-side end 11a is displaced (shifted) may be appropriately set in accordance with the angle of the trough line 12a and the ridge line 12b which form the bent portion 12 or the distance between the trough line 12a and the ridge line 12b (shortening amount).

Owing to the formation of the bent portion 12, the flat cable has two creases 12c and thus is tucked or pleated.

The folded state of the flat cable 11 is held by fitting the folded portion into a groove (not shown) formed in the stator 31.

As shown in FIG. 1 and FIG. 3, in the rotatable connector device 21 having such a structure, the fixed-side end 11a of the flat cable 11 is shifted downward in the width direction thereof by the bent portion 12. Therefore, the position of the fixed-side cable end accommodation section 34 of the outer cylindrical member 33 of the stator 31 can be low. Namely, the position of a top surface of the fixed-side cable end accommodation section 34 can be low.

For this reason, the rotator 41 can be prevented from generating an unusual sound as a result of contacting the fixed-side cable end accommodation section 34 during rotation.

Moreover, this is realized by a simple structure of forming the bent portion 12 in the flat cable 11. Unlike the above-described case where the flat cable 11 is displaced in the width direction of the flat cable 11 by means of the structure of the busbars 15, the structure is not complicated and the cost is not raised.

Furthermore, the structure can be realized by a simple operation of folding a part of the flat cable 11 and fitting the part into the groove.

In addition, although the flat cable 11 is flexible or elastic, the bent portion 12 is folded, to be shortened, along the trough line 12a and the ridge line 12b. Therefore, the flat cable 11 can be shortened and displaced in the width direction as desired easily.

Figure 4:
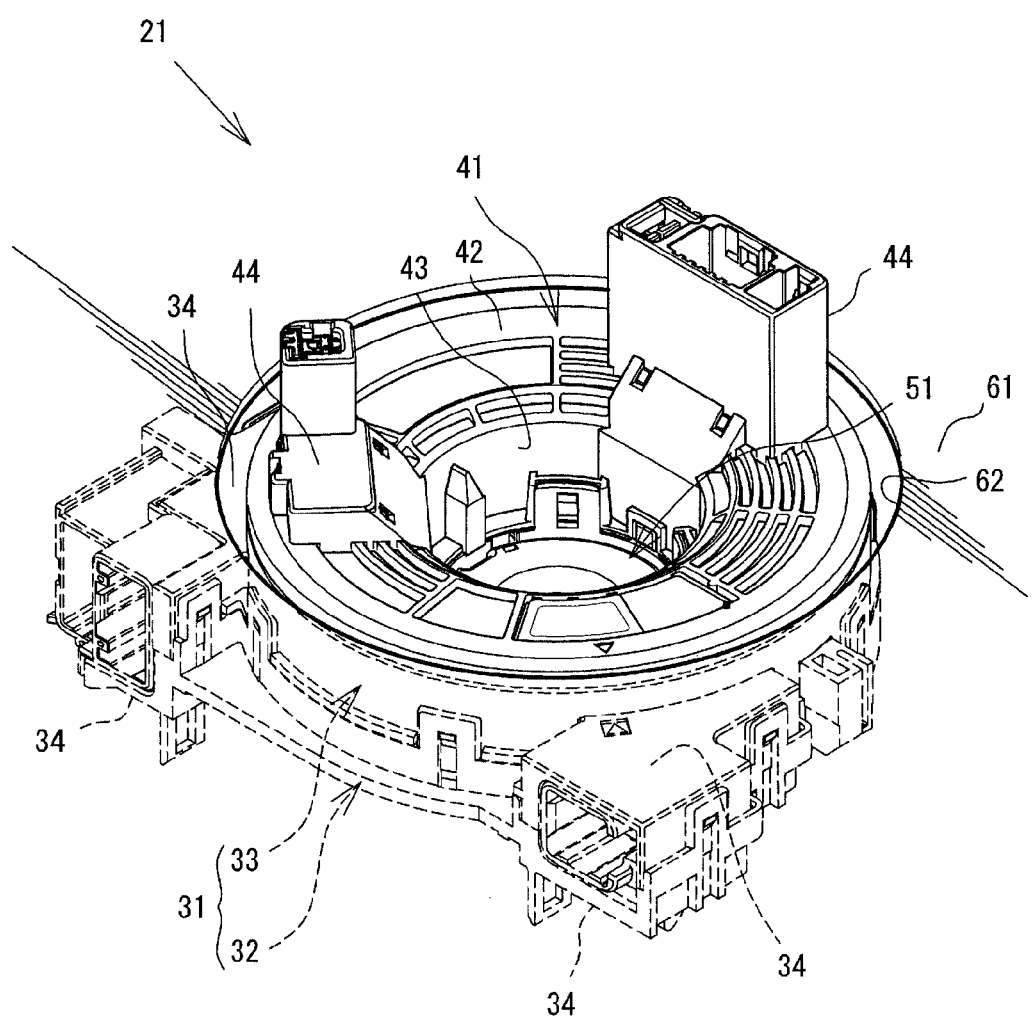
FIG. 4 is an isometric view of the rotatable connector device which is covered with a column cover.
Figure 7:
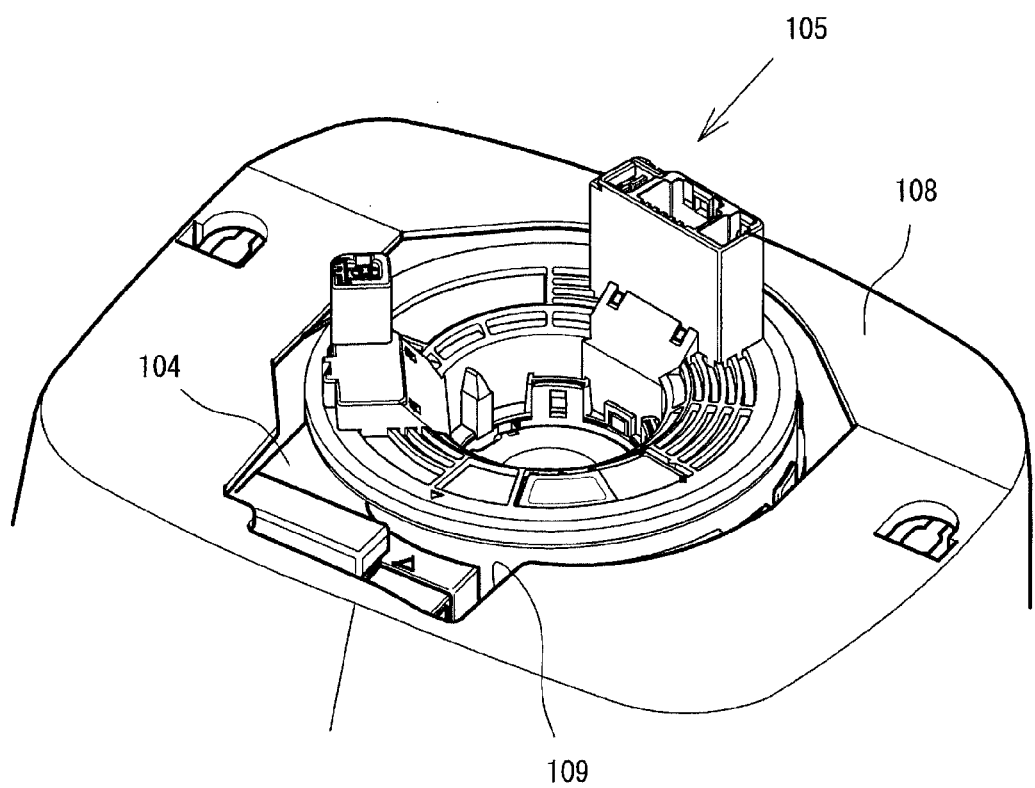
FIG. 7 is an isometric view of the conventional rotatable connector device which is covered with a column cover.

As shown in FIG. 4, in the case where the rotatable connector device 21 having such a structure is covered with a column cover 61, it is sufficient to merely form a circular hole 62 for exposing the rotator 41 in the column cover 61. Unlike the conventional art, it is not necessary to form the cut-off portion 109 (see FIG. 7). Therefore, deterioration of the external appearance can be avoided and invasion of foreign objects such as trash can be suppressed.

Figure 5:
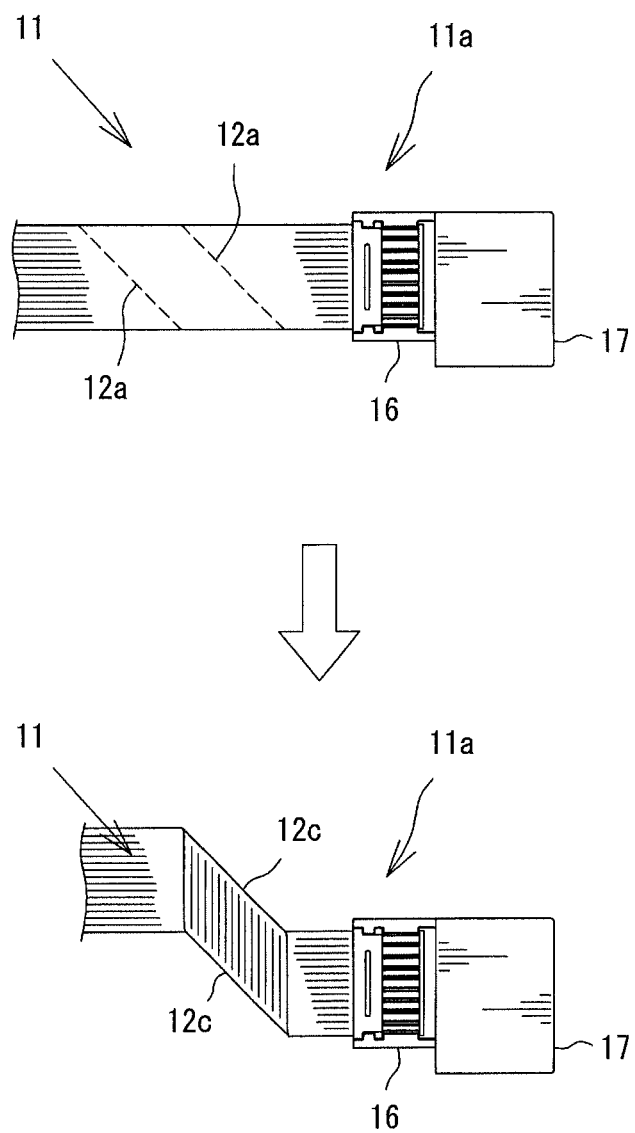
FIG. 5 is a front view of a bent portion of a flat cable in another embodiment.
Figure 6:
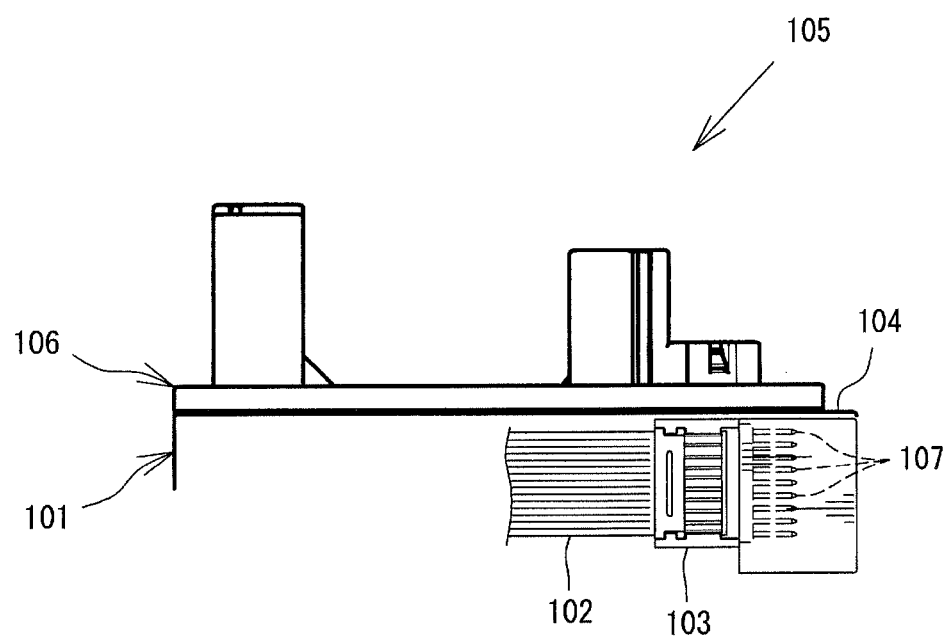
FIG. 6 shows a conventional rotatable connector device.

FIG. 5 is a front view of a bent portion 12 of the flat cable 11 in another embodiment. As shown in this figure, the bent portion 12 may be formed by bending the flat cable 11 along two trough lines 12a crossing the longitudinal direction of the flat cable 11 without folding and thus shortening the flat cable 11.

The fixed-side member according to the present invention corresponds to the stator 31 in the above-described embodiment; and in the same manner, the rotatable-side member corresponds to the rotator 41;
the terminal conductor connection section corresponds to the mold section 16; and
the portion on the side of the terminal conductor connection section corresponds to the fixed-side end 11a.

However, the present invention is not limited to the above-described embodiment, and can be carried out in many other embodiments.

For example, the bent portion may be formed at the rotatable-side end. The flat cable may be bent in a plurality of stages to form a plurality of tucks and pleats. In addition, the bent portion may be formed to provide a knot.

REFERENCE SIGNS LIST

11 ... Flat cable
11a ... Fixed-side end
12 ... Bent portion
12a ... Trough line
12b ... Ridge line
12c ... Crease
21 ... Rotatable connector device
31 ... Stator
34 ... Fixed-side cable end accommodation section
41 ... Rotator

The invention claimed is:

1. A rotatable connector device, comprising a fixed-side member which is to be fixed; and a rotatable-side member which is relatively rotatably attached to the fixed-side member, the rotatable-side member receiving a rotation input; the rotatable connector device having a fixed-side cable end accommodation section, projecting from an outer circumferential surface of the fixed-side member in a tangential direction thereof, for accommodating and holding a terminal conductor connection section provided at an end of a flat cable accommodated in the rotatable connector device;

wherein the flat cable has a bent portion, in a portion thereof on a side of the terminal conductor connection section, for bending the flat cable so as to shift the portion on the side of the terminal conductor connection section in a width direction of the flat cable, and wherein, at the bent portion, the flat cable is bent over at two parts to be formed in a zig-zag shape along a circumferential direction of the rotatable-side member.

2. A rotatable connector device, comprising a fixed-side member which is to be fixed; and a rotatable-side member which is relatively rotatably attached to the fixed-side member, the rotatable-side member receiving a rotation input; the rotatable connector device having a fixed-side cable end accommodation section, projecting from an outer circumferential surface of the fixed-side member in a tangential direction thereof, for accommodating and holding a terminal conductor connection section provided at an end of a flat cable accommodated in the rotatable connector device;

wherein the flat cable has a bent portion, in a portion thereof on a side of the terminal conductor connection section, which is folded to be shortened so as to shift the portion on the side of the terminal conductor connection section in a width direction of the flat cable, resulting in the flat cable being shortened in a longitudinal direction thereof; and wherein, at the bent portion, the flat cable is bent over at two parts to be formed in a zig-zag shape along a circumferential direction of the rotatable-side member.

3. A rotatable connector device, comprising a fixed-side member which is to be fixed; and a rotatable-side member which is relatively rotatably attached to the fixed-side member, the rotatable-side member receiving a rotation input; the rotatable connector device having a fixed-side cable end accommodation section, projecting from an outer circumferential surface of the fixed-side member in a tangential direction thereof, for accommodating and holding a terminal conductor connection section provided at an end of a flat cable accommodated in the rotatable connector device;

wherein the flat cable has a bent portion, in a portion thereof on a side of the terminal conductor connection section, which is folded, to be shortened, along a crease extending in a direction crossing a longitudinal direction of the flat cable; and wherein, at the bent portion, the flat cable is bent over at two parts to be formed in a zig-zag shape along a circumferential direction of the rotatable-side member.

4. A rotatable connector device according to claim 1, wherein the bent portion is formed of a ridge line and a trough line parallel to each other and extending in a direction crossing a longitudinal direction of the flat cable.

5. A rotatable connector device according to claim 2, wherein the bent portion is formed of a ridge line and a trough line parallel to each other and extending in a direction crossing a longitudinal direction of the flat cable.

6. A rotatable connector device according to claim 3, wherein the bent portion is formed of a ridge line and a trough line parallel to each other and extending in a direction crossing a longitudinal direction of the flat cable.

* * * * *